United States Patent [19]

Ng

[11] Patent Number: 5,185,661

[45] Date of Patent: Feb. 9, 1993

[54] INPUT SCANNER COLOR MAPPING AND INPUT/OUTPUT COLOR GAMUT TRANSFORMATION

[75] Inventor: Yee S. Ng, Fairport, N.Y.

[73] Assignee: Eastman Kodak Company, Rochester, N.Y.

[21] Appl. No.: 762,191

[22] Filed: Sep. 19, 1991

[51] Int. Cl.$^5$ .............................................. H04N 9/38
[52] U.S. Cl. ......................................... 358/75; 358/28
[58] Field of Search .................................. 358/75-80, 358/40, 28; 364/526; 346/160

[56] References Cited

U.S. PATENT DOCUMENTS

| | | | |
|---|---|---|---|
| 3,825,673 | 7/1974 | Schreiner et al. | 358/28 |
| 4,275,413 | 6/1981 | Sakamoto et al. | 358/80 |
| 4,334,240 | 6/1982 | Franklin | 358/78 |
| 4,477,833 | 10/1984 | Clark et al. | 358/80 |
| 4,615,704 | 6/1987 | Yamamoto | 346/160 |
| 4,672,433 | 6/1987 | Yamamoto et al. | 358/80 |
| 4,758,885 | 7/1988 | Sasaki et al. | 358/80 |
| 4,812,902 | 3/1989 | Fuchsberger | 358/80 |
| 4,819,193 | 4/1989 | Imao | 364/526 |

OTHER PUBLICATIONS

On the Rendition of Unprintable Colors, Gordon, James R. et al. TAGA Proceedings 39, pp. 186-195 (1987).

Primary Examiner—Stephen Brinich
Attorney, Agent, or Firm—Norman Rushefsky

[57] ABSTRACT

An input scanner and print engine system corrects for color interpretation errors in the input scanner's color filter set and maps the requested input colors to an output color printable by the printer in a uniform color space. A 3×3 transform matrix partially corrects for the color interpretation errors of the color filter set as well as maintaining the neutrality in the transformation and a non-linearly loaded lookup table further corrects the color interpretation errors for outlying datapoints in the actual color space. A color gamut compression lookup table is used to perform non-linear compression for each axis of the color space. Inside the output color gamut, a substantially one-to-one correspondence is performed by the compression table but near the outer color gamut boundary, compression is non-linearly performed. In this manner, colors lying outside of the printable output color gamut are compressed to a region within or on the surface color of the printable color gamut.

24 Claims, 9 Drawing Sheets

INPUT SCANNER COLOR MAPPING AND INPUT/OUTPUT COLOR GAMUT TRANSFORMATION

Technical Field

This invention relates to the field of color image reproduction and, more particularly, is directed to a method and apparatus for performing color correction of input color scanner signals and for performing input/output color gamut transformation where the output color gamut of the print engine system differs from the input color gamut of the input system.

The color correction system can be used in a reproduction machine such as a color scanner, color facsimile producer, color copier or the like including combinations thereof.

BACKGROUND ART

A document containing colors to be reproduced, defined in terms of a uniform color space such as the CIELAB space, is typically sensed by an input scanner. The input scanner can be of the charge couple device (CCD) type which senses the colors of the actual document and divides the document into a number of discrete pixels, each of which is analyzed to determine its color content. The scanner then provides color information in terms of three primary colors (red, green and blue) which form color separation signals.

In an ideal situation if the color filter set used by the input scanner were perfect, it would be possible to use the input scanner's output to reproduce colors via an output device, such as a print engine. In practice, however, the typical input color scanner uses a non-color matching function color filter which introduces color interpretation errors into the system. If the color filter is not a color matching function of an average human observer, then large color errors can be associated with what the actual input color is ($L_a^* a_a^* b_a^*$) and what an observer perceives it is ($L^{*\prime} a^{*\prime} b^{*\prime}$). As a result, it is necessary to correct the signals generated by the input scanner to account for the color interpretation errors produced by the color filter set.

Known methods for correcting the color interpretation errors make use of lookup tables which are loaded with the corrected color values corresponding to all the visually discernable combinations of the input color scanner's output signals. The output signal of the input color scanner address the lookup table which provides the correct or "true" color value, i.e., $L_t^* a_t^* b_t^*$. However, this type of system requires a tremendously large lookup table to store the wide range of colors which can be produced, e.g. on the order of 17 million possible color combinations. Such a large memory becomes prohibitively expensive.

Other attempts at reducing the size of the lookup tables have included loading the lookup table memory with corrected color values for only a fraction of the total number of input colors. Corrected color values for each point in the color space lying between those values stored in the lookup table memory are derived via an interpolation process. However, these systems are linearly designed such that each color value loaded into the table is evenly spaced within the color space. While this system is acceptable for color signals having a linear function mapping to the true color space, it results in only mediocre performance for a non-linear situation.

At the print engine end of the system, the output device, i.e. the print engine itself, only has the capability to print over a limited output color gamut. Therefore, it has been found necessary to map the requested input color from the input color gamut, e.g. $L_i^* a_i^* b_i^*$, to an output color which falls within the output color gamut, e.g. $L_o^* a_o^* b_o^*$, and is thus printable by the output device. This mapping is often accomplished through compression of the requested input color gamut. The compression is performed in a manner which attempts to achieve pleasing viewing results.

Prior methods for compressing the input color gamut to be compatible with the printer's output color gamut have traditionally been performed by the input scanner operator. Mathematical formulae for describing color gamuts and mapping from one to another are described in the paper "On the Rendition of Unprintable Colors", J. R. Gordon, et al., *TAGA* Proceedings 39: Pages 186–195 (1987).

DETAILED DESCRIPTION OF THE INVENTION

The present invention solves the above problems by providing an input scanner and print engine system for correcting color interpretation errors due to the input scanner's color filter set and for mapping the requested input colors to an output color printable by the printer in a uniform color space.

The input color scanner system includes a $3 \times 3$ transformation matrix which provides partial color correction for the color filter set. The output from the matrix is provided to a lookup table which is non-linearly loaded to have greater resolution in those color regions having the greatest non-linearity. In this manner, the $3 \times 3$ matrix tries to maintain color neutrality in the transformation and corrects for the color regions which are substantially distributed uniformly, such as those areas within the color solid for the true color space, and the lookup table is used to provide higher resolution in the other regions, i.e. for areas outside of the true color space. This has the advantage of reducing the overall size of the lookup table by minimizing the number of values needed to be stored for the color regions having a linear correspondence of actual to true color values.

It is a further advantage of the invention to use tri-linear interpolation to determine a true color value for those actual colors lying in the outer regions of or outside the true color space.

With respect to the print engine system, the requested input color gamut is non-linearly compressed to be within the output color gamut for each axis, e.g. $L^*$, $a^*$ and $b^*$, of the uniform color space. The invention makes use of a color gamut compression lookup table for preserving the hue H but compressing the saturation along the same hue angle. The color gamut compression table maps those color points lying outside of the printer's output color gamut to a defined region either within or on the boundary of the printer's output color gamut. Greater compression is performed towards the higher saturation end of the requested input color and little or no compression is performed when the requested input color is well within the printer's output color gamut.

It is an advantage of the print engine system to achieve a natural image by non-linearly compressing those requested input colors lying outside of the output color gamut to a region near or on the boundary of the color solid representing the output color gamut. This allows the requested input colors lying outside of the output color gamut and having the same hue and saturation to be distinguishable from one another.

It is a further advantage to combine the input scanner system with the print engine system to provide a facsimile/copier device. The input scanner system generates a true color space from the original document which can then be transmitted in the facsimile mode or presented to the print engine system as the requested input color. The print engine system then transforms the requested input color to an output color within the printable output color gamut.

Other objects, advantages and novel features of the present invention will become apparent from the following detailed description of the invention when considered in conjunction with the accompanying drawings.

BEST MODE FOR CARRYING OUT THE INVENTION

Figure 1:
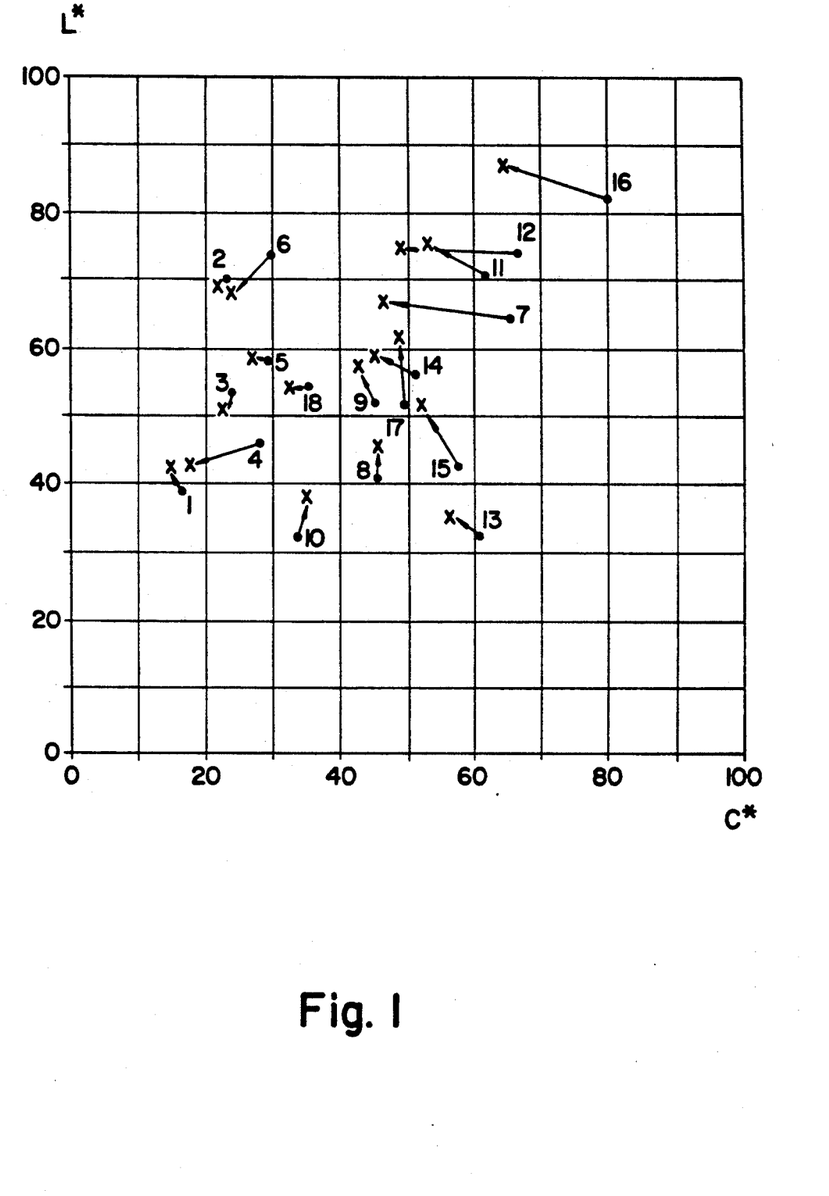
FIG. 1 is a graph with $L^*$, $C^*$ coordinates illustrating the color interpretation errors produced by a filter set in a scanner.
Figure 2:
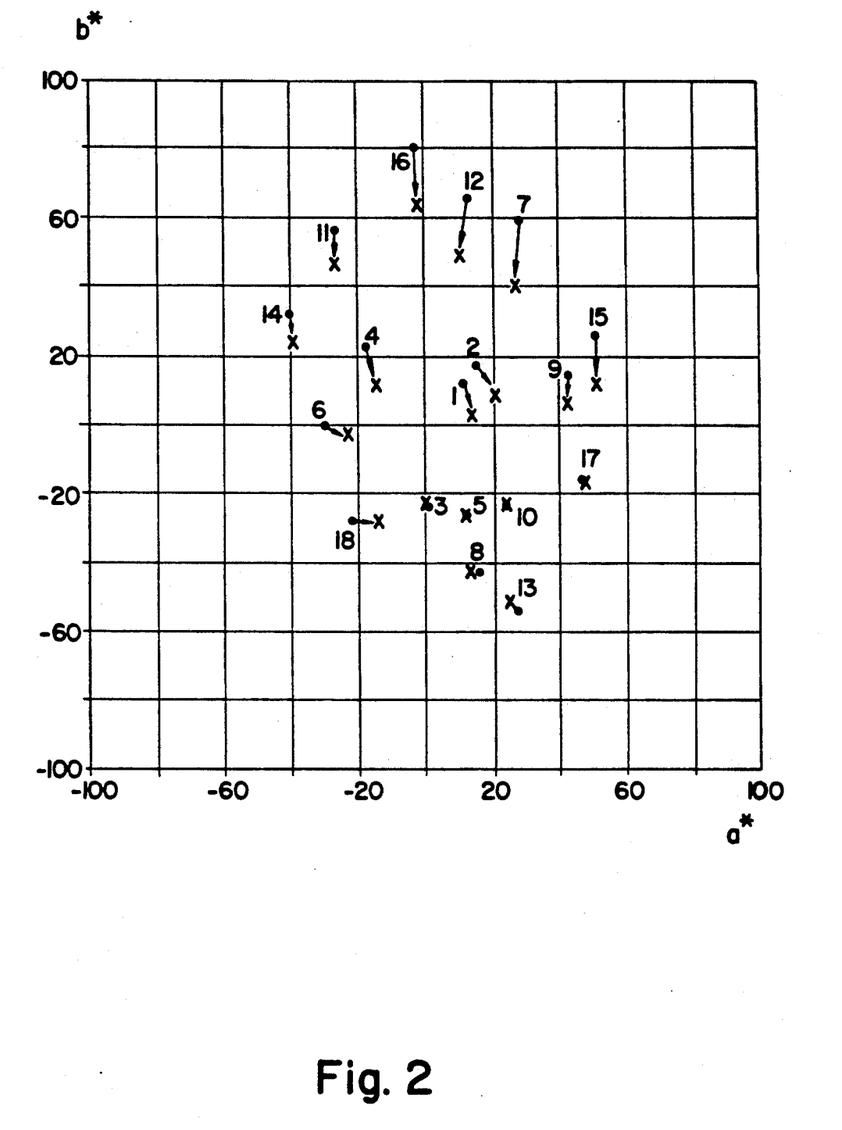
FIG. 2 is a graph with $a^*$, $b^*$ coordinates illustrating the color interpretation errors produced by a filter set in a scanner.

FIGS. 1 and 2 are plots of test charts scanned by a conventional scanner having an imperfect color filter set. FIG. 1 charts the lightness $L^*$ versus the chrominance $C^*$ and FIG. 2 charts the $b^*$ space versus the $a^*$ space for the known $L^*$ $a^*$ $b^*$ near uniform color space. While the invention will be described with reference to $L^*$ $a^*$ $b^*$ spaces, other color spaces may be used such as $L^*$ $u^*$ $v^*$, etc. These plots illustrate the color interpretation errors produced by a typical input color scanner using non-color matching function color filters. These errors result from the imperfections of the color filter set used by the input color scanner to separate the colors from an original color picture sensed by the input scanner. The amount of color interpretation error is represented in FIGS. 1 and 2 by the vector arrows indicating the true color points for the input scanner's output points (1-17). The color interpretation errors are not uniformly distributed throughout the near uniform color space. Those points lying in regions near or outside the color gamat of the scanner have a greater error associated with them than the points in the interior of the color space. Thus, in those regions two input colors which may be widely separated in the uniform color space may be interpreted as close to each other after the color filter.

Figure 3:
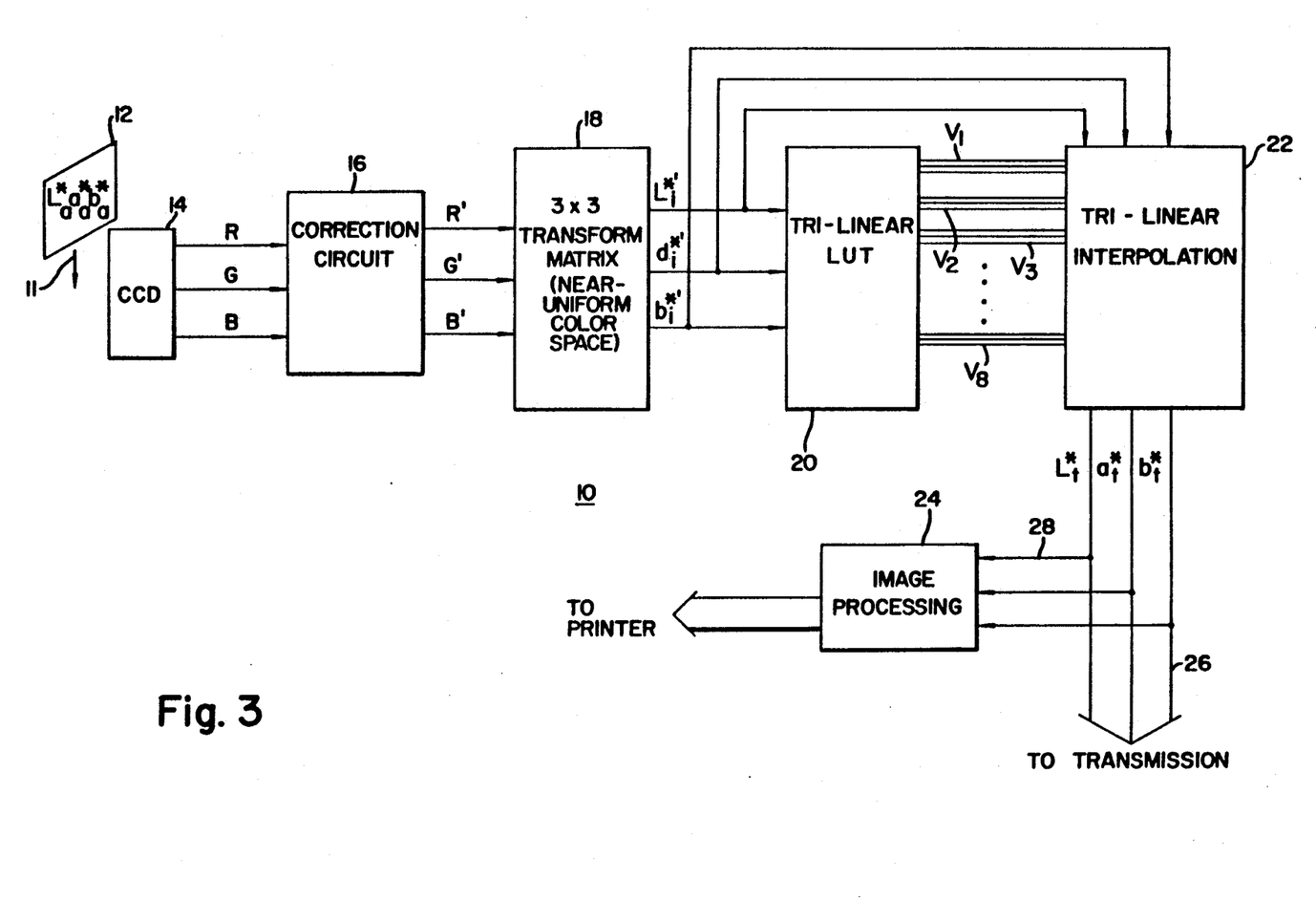
FIG. 3 is a simplified block diagram of an input system for a scanner according to the present invention.

Referring to FIG. 3, a block diagram for an input system 10 of an input color scanner is shown. The input system 10 corrects for the imperfections in the input color scanner's color filter set by transforming the color separation signals (R, G, B) produced by the input color scanner's sensors to a true uniform color space, e.g. $L_t^*$ $a_t^*$ $b_t^*$, that can be used for transmission, display or subsequent printing.

A document 12 passes before CCD sensors 14 (as indicated by arrow 11). The CCD sensors 14 scan the document 12 into the input system 10. The document 12 contains various colors indicated by the actual color space, e.g., $L^*a$ $b^*a$ $c^*a$. The original color document 12 is thus scanned by the CCD sensors 14 to produce color separation signals R, G, B.

The color separation signals R, G, B, are provided to a correction circuit 16 which corrects for non-uniformity and shading variations. These variations may occur from the non-uniformity of the illumination source or the scanner sensor, e.g., gain, dark noise and sensitivity difference between pixels. The output from the correction circuit 16 produces modified separation signals R', G', B' which are provided to a 3×3 color transform matrix 18. In the event that the document 12 may be one of several different types, e.g. printed image on paper or photographic paper or transparency it may be desirable for the correction circuit 16 to provide for differing corrections depending upon the type of document. The type of input referred to as "header information" may be indicated by an operator input or a code written at the head of the document and ready by a suitably programmed CCD may indicate the type of document or the CCD may automatically sense the differences between the originals based on their respective characteristics, e.g. amounts of reflectivity of background.

The operating equations for the 3×3 transform matrix 18 may be obtained using a least squares method from the scanning results used to plot the charts shown in FIGS. 1 and 2. The transform matrix 18 converts the modified separation signals R', G', B', into a near-uniform color space $(L^{*\prime}\ a^{*\prime}\ b^{*\prime})in$. The near-uniform color space $(L^{*\prime}\ a^{*\prime}\ b^{*\prime})in$ is the color coordinates for what the actual color space is perceived to be with the color filter errors included. The near-uniform color space is optimized by the 3×3 transform matrix 18 but still includes some of the color error associated with the non-color matching function color filter set of the scanner 14. One also may use the 3×3 matrix to maintain the neutrality of the system, i.e. the color that is neutral $R = G = B$ will transform to a $L^*$ $a^*$ $b^*$ values, where $a^*$ and $b^*$ are close to zero.

The near-uniform color space value output from the transform matrix 18 is provided to a tri-linear lookup table 20 and a tri-linear interpolation circuit 22. The near-uniform color space value $(L^{*\prime}\ a^{*\prime}\ b^{*\prime})in$ is the systems best estimate of the color coordinates for the original input colors, i.e. those colors on document 12 represented by the actual color space $L^*_a\ a^*_a\ b^*_a$.

The $(L^{*\prime}\ a^{*\prime}\ b^{*\prime})in$ values from the transform matrix 18 function as an index for the lookup table 20. The lookup table 20 is a non-linear lookup table having non-linearly stored therein true color space values for the true color space, i.e., a greater number of values are stored for color regions in the true color space where the color filter set errors are largest to provide greater resolution in those regions. The distribution of the stored values is predetermined in accordance with the measurement of the near-uniform color space input $(L^{*\prime}\ a^{*\prime}\ b^{*\prime})_{in}$ as a function of the true color space output, $L_t^*\ a_t^*\ b_t^*$. The tri-linear lookup table 20 produces the eight closest datapoints in the true color space to the $(L^{*'} a^{*'} b^{*'})_{in}$ value. These eight datapoints are output to the tri-linear interpolator 22.

Alternatively, the lookup table 20 may have a large number of index points, however, the index points that are measured real datapoints can vary within the color space. For regions of higher non-linearity, there is a need for more real datapoints to serve as index points than for regions of less non-linearity.

Figure 4:
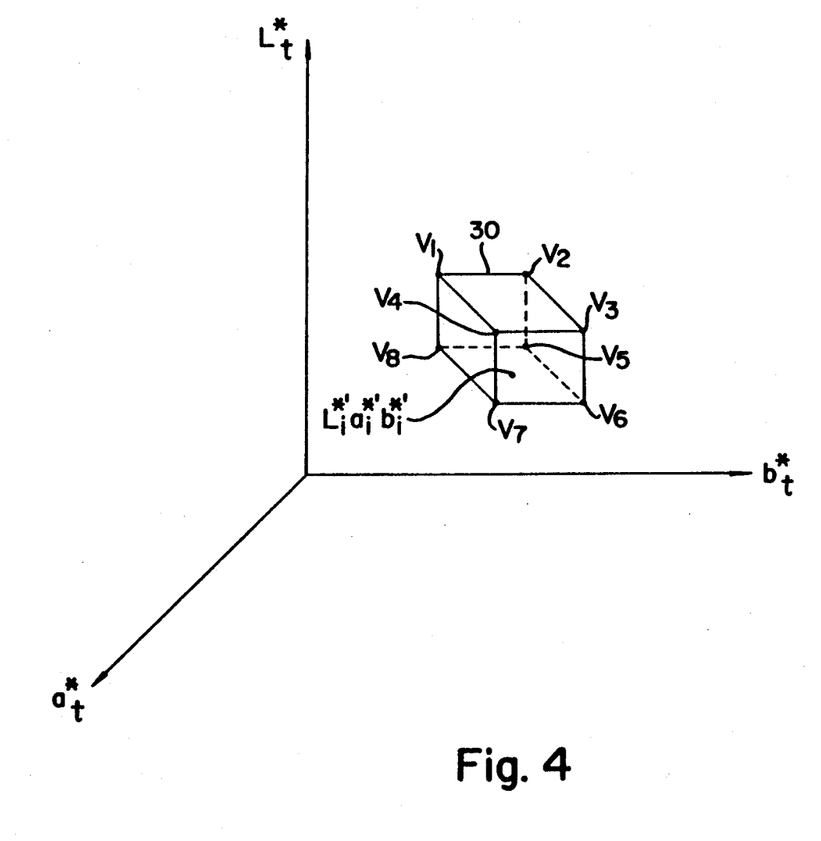
FIG. 4 is a color space coordinate diagram illustrating the tri-linear lookup table functions of FIG. 3.

FIG. 4 shows the determination of the eight closest datapoints corresponding to the input color space value $(L^{*'} a^{*'} b^{*'})_{in}$. These eight datapoints form the vertices of a three-dimensional volume which for example may be a cube 30 around the color space input value. Of course, other types of shapes are contemplated. The eight vertices, $V_1$-$V_8$, of the three-dimensional volume 30 have associated true color space values $L_t^* a_t^* b_t^*$ which are provided to the interpolator circuit 22.

The tri-linear interpolator circuit 22 interpolates, using well-known interpolation calculations, between the eight closest datapoints to the measured $(L^{*'} a^{*'} b^{*'})_{in}$ value to determine the true color space value output $L_t^* a_t^* b_t^*$ as indicated at 26. This true or real color space value $L_t^* a_t^* b_t^*$ can then be used for transmission, such as in a facsimile scanner, or can be provided with further image processing 24 as shown in FIG. 3. The image processing 24 can be, for example, gamma correction, unsharp masking, scaling, half-toning and the mapping of the true color space value to within a printable output color gamut, etc.

In operation of the input system 10 shown in FIG. 3, the 3×3 transform matrix 18 partially corrects for the color interpretation errors of the color filter set to provide a near uniform color space. This near-uniform color space is acceptable for the interior color regions within the true color space but still includes substantial color interpretation errors for those color regions near or outside of the true input color space, e.g., red/yellow regions often have the largest color interpretation errors in the filter set used. The lookup table 20 is therefore non-linearly filled to have a greater number of datapoints for the color regions having the largest errors (red/yellow regions) and a lesser number for the inner color regions. This enables the lookup table 20 to have a higher resolution, i.e. more datapoints, in the outer color regions while still minimizing its overall size by reducing the number of datapoints for the inner color regions. The input system 10 therefore relies on the 3×3 transform matrix 18 to correct the errors associated with input colors within the interior color regions and to maintain neutrality in the color transformation.

As noted above for example, the color filter set for an input scanner 14 may greatly reduce the color accuracy between the true color space value $L_t^* a_t^* b_t^*$ and the preceived color space value $(L^{*'}, a^{*'}, b^{*'})_{in}$ in the red/yellow color region than in other color regions. Therefore, the tri-linear lookup table 20 stores more datapoints in the red/yellow region than in the other regions to account for the non-linearity of the color interpretation errors. Because for the interior colors the color interpretation errors are sufficiently corrected via the 3×3 transform matrix 18, the lookup table 20 does not need the same number of datapoints in those regions thus keeping its overall size small. The use of the 3×3 matrix with the lookup table assures excellent results over all color regions.

In the alternative embodiment noted above, a high number of index points may be stored with a higher resolution of measured real datapoints being in the more non-linear regions.

Figure 5:
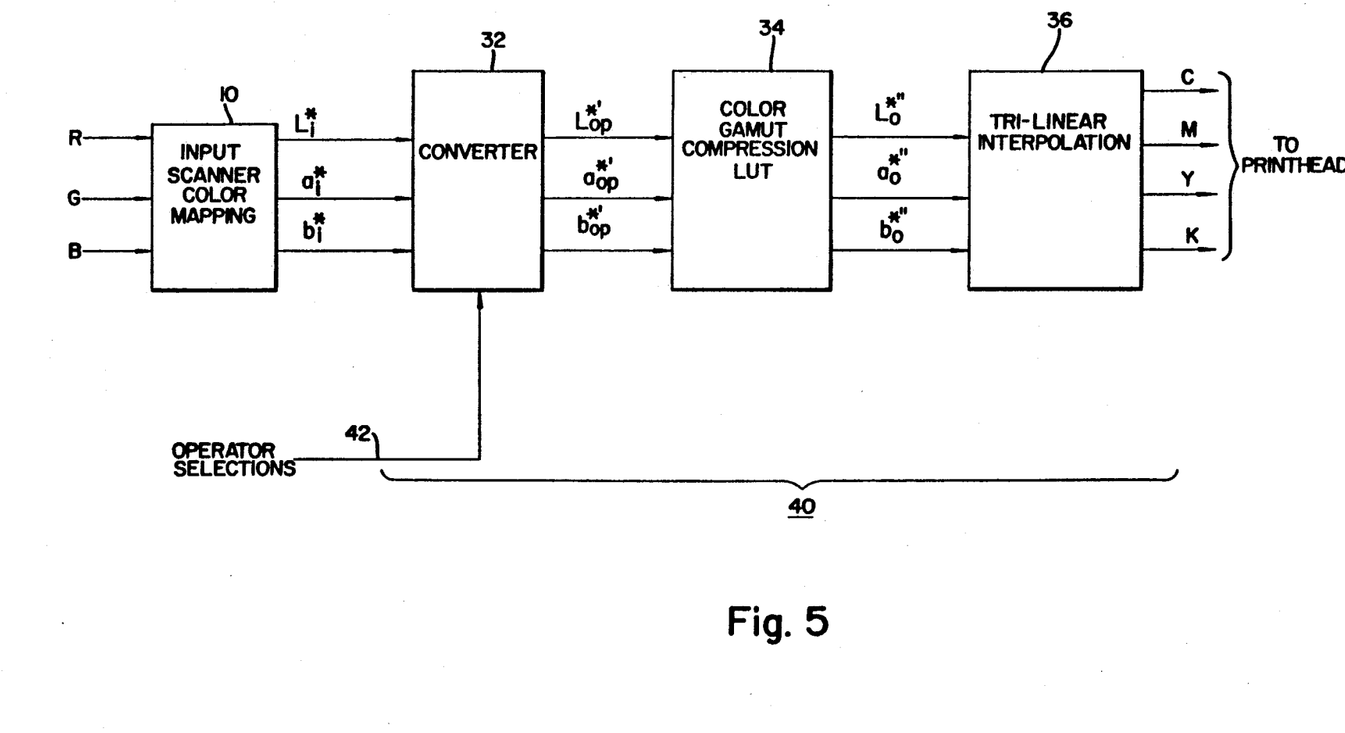
FIG. 5 is a simplified block diagram of a print engine system according to the present invention.

Referring to FIG. 5, there is shown a print engine output system 40. The system 40 provides a transformation of datapoints from a requested input color gamut to an output color gamut associated with a particular printer. The requested input color datapoints $L_i^* a_i^* b_i^*$ may be the true color space values $L_t^*, a_t^*, b_t^*$ received from an input system as described above. With respect to FIGS. 5-9, the requested input color datapoint will be represented as $P_i(L_i^* a_i^* b_i^*)$ which will be mapped to an output color represented as $P_o(L_o^* a_o^* b_o^*)$ in the output color gamut printable by the particular printer.

Figure 6:
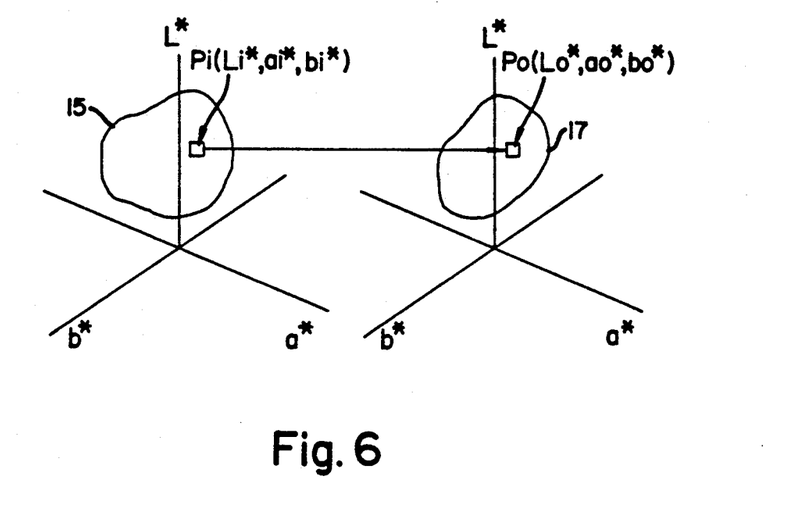
FIG. 6 is an example of mapping input coordinates to output coordinates for a color space.

FIG. 6 illustrates the necessary mapping of the input color datapoint $P_i$, within the input color solid 15 to the printable output color datapoint $P_o$ within the output color solid 17. The print engine system 40 is necessary because the output color gamut achievable by a particular printer does not often match the input color gamut of the input media. The system 40 is used, therefore, to handle the unprintable colors which lie outside of the output color gamut for the particular output device, e.g. the printer.

Referring back to FIG. 5, color separation signals, R, G, B, from an input scanner (not shown) are provided to an input scanner color mapping block 10. The block 10 converts the color separation signals into a uniform color space that is provided as the requested input color datapoint $P_i(L_i^* a_i^* b_i^*)$ to the print engine system 40. The input scanner color mapping block 10 can be, for example in a combination facsimile and copier machine, the input system 10 for the input scanner as described in FIG. 3. Alternately, the input scanner color mapping block 10 can be composed of a simple lookup table for converting the color separation signals into the requested input color datapoints for the print engine system 40.

The requested input color datapoint $P_i(L_i^* a_i^* b_i^*)$ is provided to a converter 32 which also receives an operator selection signal 42. The converter 32 allows the operator to adjust the requested input color as desired or based on header information which gives an indication of the type of output medium that is to be printed. That is, is the output to be made upon a sheet of plain paper or transparency where the printer is say an electrophotographic printer and the printhead is for example an LED printhead. In addition, the converter 32 receives header information regarding the original document 12. A default situation may be provided for in the typical case where the original is a printed document on plain paper and the output is also to be printed on plain paper. The importance of header information is to ensure that the colors of input and output are to be conformed in accordance with the environment in which they are to be perceived. Thus, a transparency is perceived as a projected image whereas a printed document is perceived through reflection of light. The converter 32 then provides the operator modified or desired output color, represented as $P_{op}(L^{*'} a^{*'} b^{*'})$ to the color gamut compression lookup table 34. The color gamut compression table 34 performs any necessary compression of the desired output color $P_{op}(L^{*'} a^{*'} b^{*'})$ so that it may be printed within the printer's output color gamut.

Figure 7A:
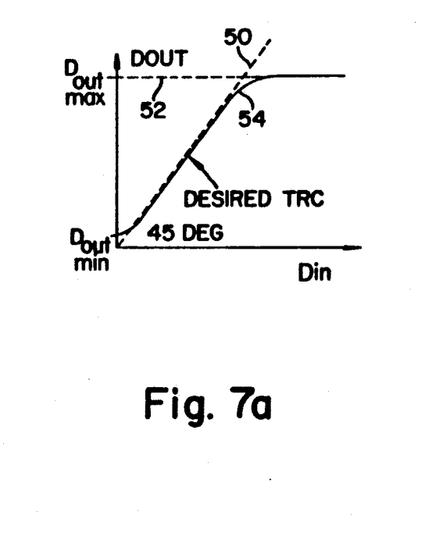
FIGS. 7a, 7b and 7c are plots showing a compressed curve as a function of its input/output.
Figure 7B:
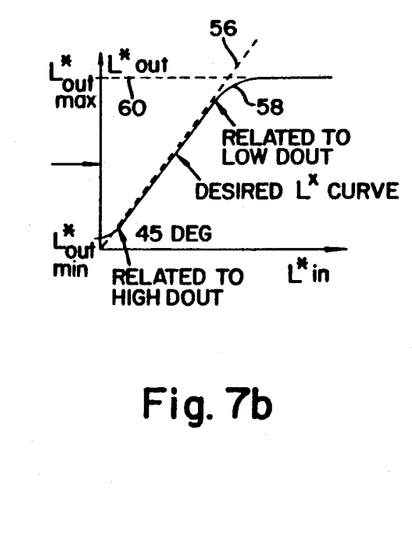

FIGS. 7a and 7b are used as a simplified example to illustrate color gamut compression in one dimension, e.g. the lightness L* space. In order to fully understand the compression, FIG. 7a illustrates a plot of a well-known tonal reproductive curve (TRC) as a function of the density input "$D_{in}$" and density output "$D_{out}$" of a particular printer. In an ideal situation, the TRC is represented by dashed line 50 having a positive slope equalling one such that $D_{in}=D_{out}$ for the entire density range. However, in practical situations, for the high density range, $D_{out}$ is limited by printer toner fusing, surface reflection, etc. on a reflection copy as indicated by $D_{out\ max}$ represented by dashed line 52. At the low density range, $D_{out}$ is limited by the necessity of having to handle specular reflected light in the input (or some scene luminances which exceed that of the reference white) in order to achieve a pleasant output scene, as indicated by $D_{out\ min}$. Therefore, for practical purposes, the desired $D_{out}/D_{in}$ curve is represented by solid curve 54. It should be noted that for the mid tone region, the ideal 50 and desired curves 54 are almost identical but as the high and low ranges approach, the slope decreases and the ideal 50 and desired 54 curves diverge.

Advancing the TRC situation to that for a uniform color space, FIG. 7b illustrates a plot of the $L^*_{in}/L^*_{out}$ curve for the lightness space L*, e.g., mapping of the reflection input to reflection copy output. In FIG. 7b, the ideal input/output curve 56 is represented by a dashed line and the desired $L^*_{in}/L^*_{out}$ curve 58 for the lightness space L* is represented by a solid line. As with the tonal reproduction curve of FIG. 7a, the desired curve 58 closely corresponds to the ideal curve 56, having a slope equalling one, except at the high end (where specular reflection is handled) or the low end (where maximum density is limited by the printer output process). Any requested input lightness datapoints from the input color gamut lying outside of the maximum printer lightness space output, $L^*_{out\ max}$ represented by dashed line 60, (outside of the output color gamut), are non-linearly compressed onto the desired L* curve 58, i.e., those points at the high and low ends are compressed greater amounts than those points in the mid range.

In the color system of FIG. 5, the uniform color space has three individual color axes or variables, L*, a* and b* that are independent of each other. Therefore, a change of the desired curve for one axis, such as for the lightness space L*, will not affect the other two axes. Similarly, it is possible to change the saturation and hue H by changing the a*, b* pair without changing the lightness space L*.

Referring back to FIG. 5, the color gamut compression lookup table 34 operates for the desired operator selected input color $P_{op}$(L*' a*' b*') to first perform an $L^*_{out}/L^*_{in}$ non-linear compression in the L* space. This compression is done as described with respect to FIG. 7b. The color gamut compression table 34 thus provides a certain output lightness value $L_o^{*\prime}$ from the $L_{op}^{*\prime}$ input value. This compression is performed in accordance with the measured possible upper $L^*_{out\ max}$ and lower $L^*_{out\ min}$ limit values inherent in the process of the output printer. These limit values must be predetermined.

Figure 8:
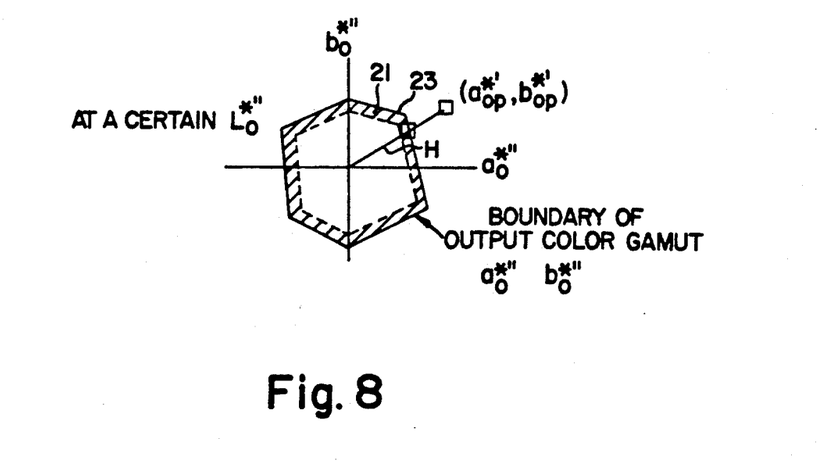
FIG. 8 is a diagram illustrating the boundary of an output color gamut.

The color gamut compression lookup table 34 stores the boundary of the outer color gamut for the output printer for every $L_o^{*\prime\prime}$ value at $\Delta L_o^{*\prime\prime}$ intervals. For example, storing outer color gamut boundaries from $L_o^{*\prime\prime}=92$ to $L_o^{*\prime\prime}=24$, i.e., the present process condition, in the color gamut compression lookup table 34, produces an output color gamut curve in the $a_o^{*\prime\prime}$, $b_o^{*\prime\prime}$ space for each of the 69 $L_o^{*\prime\prime}$ values ($\Delta L_o^{*\prime\prime}=1$) as shown in FIG. 8. Once the compressed $L_o^{*\prime\prime}$ value is determined, the hue angle can be preserved. From the $L_o^{*\prime\prime}$ output, the hue angle, H, is calculated according to the equation H=arctan ($b_{op}^{*\prime}/a_{op}^{*\prime}$) since the boundary values are stored in the lookup table 34 in terms of the hue angle, H and $a_o^{*\prime\prime}$ pair. The outer boundary of the printer's output color gamut is stored in the lookup table 34 in terms of four quadrants represented by $a_o^{*\prime\prime}$, $b_o^{*\prime\prime}$ both positive; $a_o^{*\prime\prime}$, $b_o^{*\prime\prime}$ both negative; $a_o^{*\prime\prime}$ positive, $b_o^{*\prime\prime}$ negative; and $a_o^{*\prime\prime}$ negative, $b_o^{*\prime\prime}$ positive. By testing the signs of the $a_{op}^{*\prime}$ and $b_{op}^{*\prime}$ values, the appropriate quadrant can be determined before calculating the hue angle.

Figure 7C:
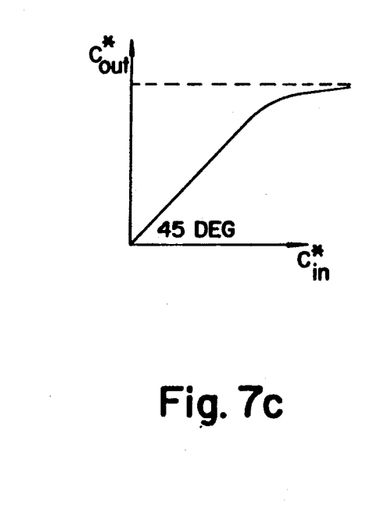

In order to preserve the hue H, but to reduce the saturation or chroma along the same hue angle, non-linear compression is also performed for the saturation, as was done for the L* space. By non-linearly compressing the saturation, all out of color gamut points $a_{op}^{*\prime}$, $b_{op}^{*\prime}$ as shown in FIG. 8, are compressed to a certain region 21 within the boundary surface 23 of the printable color solid or on the boundary surface 23 itself. Thus, more compression is performed in the higher saturation end and little or no compression is performed when the $a_{op}^{*\prime}$, $b_{op}^{*\prime}$ space is within the color solid. It is therefore not necessary to compress all out of color gamut points to a single point on the color solid surface (namely the color point on the color solid having that particular hue angle and lightness) as is performed by clipping. By using the region 21 near the boundary and non-linearly compressing datapoints outside of the output color gamut into this region 21, more natural looking images are produced because the out of color gamut points are still distinguishable from each other within the output color gamut. With reference to FIG. 7C, a compression curve for every hue angle (H) at $\Delta H$ intervals apart for each L* may be stored in the LUT 34 that links the input and output saturation C*. Then $C^*_{out}$ is decoded to get $a_o^{*\prime\prime}$, $b_o^{*\prime\prime}$ from $C_o^{*\prime\prime}=[(a_o^{*\prime\prime})^2+(b_o^{*\prime\prime})^2]^{\frac{1}{2}}$, $H_o^{*\prime\prime}=\tan^{-1}b_o^{*\prime\prime}/a_o^{*\prime\prime}$ and the quadrant is determined.

The color gamut compression lookup table 34 provides non-linear compression for datapoints lying outside of the output color gamut for each component of the color space to provide a printable color space, $L_o^{*\prime\prime}$, $a_o^{*\prime\prime}$, $b_o^{*\prime\prime}$ output as shown in FIG. 5. This output color gamut is then provided to a tri-linear lookup table 36 which produces the output color values, cyan, yellow, magenta and/or black (CYMK) to the printhead.

In operation, the print engine system 40 operates to compress those colors lying outside of the printable color gamut to a region within and up to the surface color of the printable color gamut, rather than just to the surface color itself (clipping). This allows for color differences to be discerned between the unprintable colors in order to make for a more natural color print.

Figures 9, 9A:
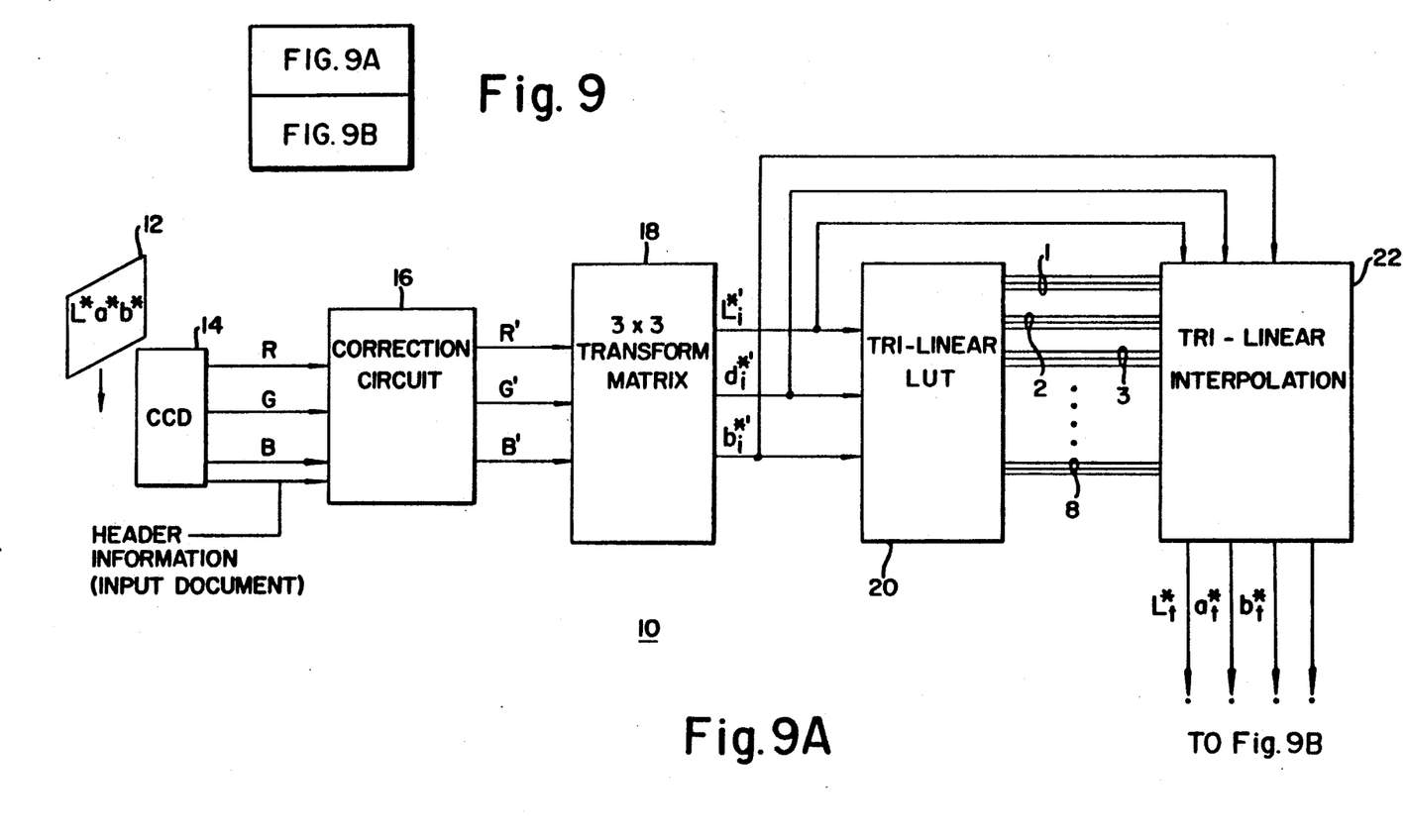
FIGS. 9, 9A and 9B illustrate the combination input system and print engine system.
Figure 9B:
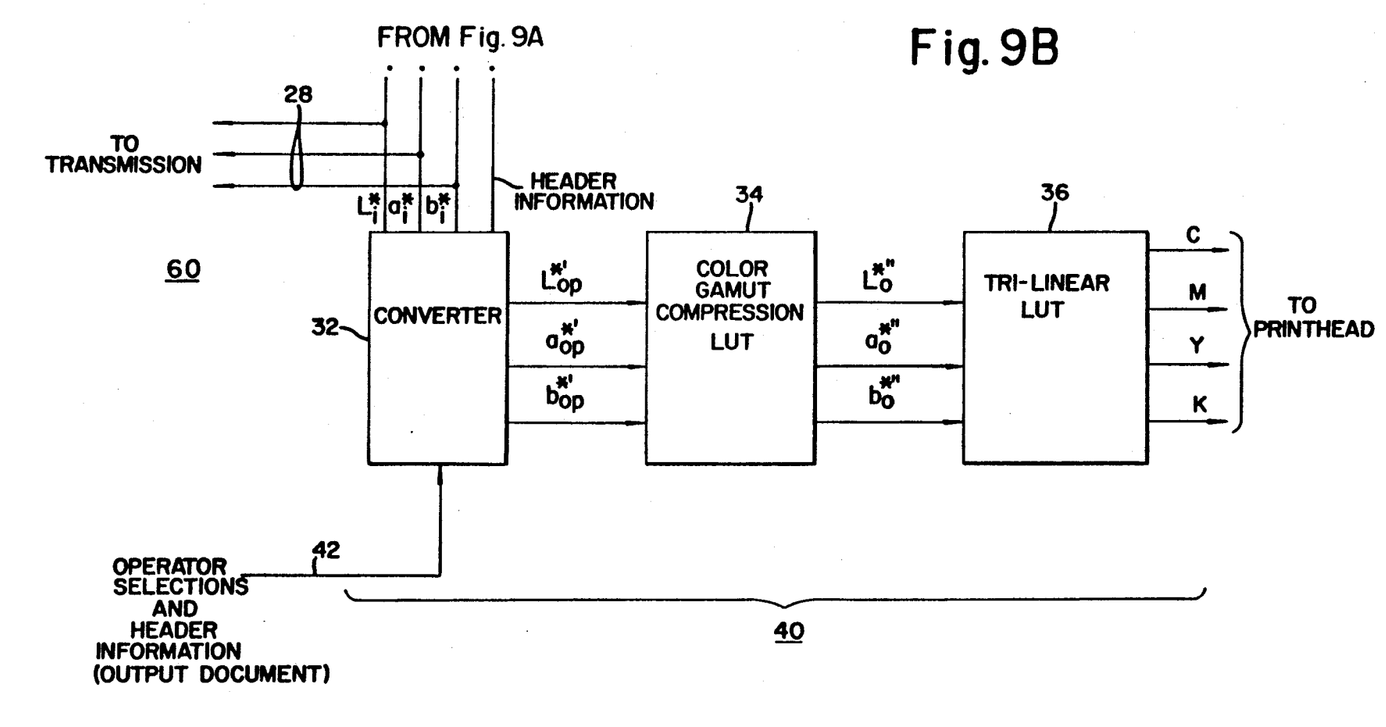

Referring to FIG. 9, there is shown a combination system 60 including an input system 10 and a print engine system 40. This type of system can be used as a facsimile and copier combined device. The front end input system 10 converts the original document 12 into a true color space $L_t^* a_t^* b_t^*$ which can be transmitted over signal lines 28 as indicated. Alternately, the true color space $L_t^* a_t^* b_t^*$ can be provided as input datapoints $P_i(L_i^* a_i^* b_i^*)$ to the print engine system 40 for converting the requested input color to CMYK signals for the printhead.

The invention has been described in detail with particular reference to preferred embodiments thereof, but it will be understood that variations and modifications can be effected within the spirit and scope of the invention.

What is claimed:

1. A method for correcting color interpretation errors in color separation signals produced with a scanner sensor in an input scanner system, the method comprising the steps of:

transforming the color separation signals in a matrix transformation circuit into near-uniform color space values;

addressing a tri-linear lookup table with the near-uniform color space values;

obtaining a set of the nearest known datapoints stored in the lookup table for a true uniform color space corresponding to the near-uniform color space values; and interpolating between said set of datapoints and said near uniform color space values to determine the true uniform color space values for the color separation signals produced with the scanner sensor.

2. A method according to claim 1, wherein the step of transforming is carried out with a 3×3 color correcting matrix.

3. A method according to claim 2, wherein the step of transforming comprises the steps of:

measuring the color interpretation errors via a test pattern input to the scanner sensor of the input scanner system to obtain error values;

forming matrix transformation equations for use in the matrix transformation circuit in accordance with the error values obtained from the measuring step.

4. A method according to claim 3, wherein the step of obtaining a set comprises the steps of:

non-linearly loading the lookup table with a greater resolution of measured datapoints in areas near the exterior of the true color space than in areas within the true color space;

selecting the set of datapoints from the loaded lookup table which are nearest to the addressed near-uniform color space values.

5. A method according to claim 1, further comprising the step of:

modifying the color separation signals in a correction circuit prior to performing the step of transforming.

6. A method according to claim 1, further comprising the step of:

transmitting the true color space values obtained from the interpolation step.

7. A method according to claim 1, further comprising the steps of:

performing image processing on the true color space values obtained from the interpolation step;

transmitting image processed true color space values, obtained from the performing step, to a printer.

8. A circuit for correcting color interpretation errors found in color separation signals produced with a scanner sensor in an input scanner device, comprising:

a matrix transformation circuit receiving the color separation signals from the scanner sensor, the matrix circuit transforming the color separation signals into near-uniform color space values in accordance with predetermined error measurements of the input scanner device;

a tri-linear lookup table coupled to the matrix transformation circuit storing a number of datapoints associated with a true color space, the lookup table being addressed by the near-uniform color space values from the matrix circuit to output a set of datapoints in the true color space nearest to the near-uniform color space values;

an interpolation circuit coupled to the tri-linear lookup table receiving the output of the lookup table and receiving the near-uniform color space values;

wherein the interpolation circuit interpolates between said set of datapoints in the true color space and the near-uniform color space values to obtain true color space values for the color separation signals produced by the scanner sensor.

9. A circuit according to claim 8, wherein the matrix transformation circuit is a 3×3 color correcting transformation circuit.

10. A circuit according to claim 9, further comprising:

means for image processing said true color space values coupled to the interpolation circuit.

11. A method for mapping a requested datapoint in an input color space having a number of independent variables to an output datapoint within a printable output color gamut, the method comprising the steps of:

inputting the requested datapoint to a color gamut compression circuit;

non-linearly compressing a first of the number of independent variables of the requested datapoint to a first output variable for the output datapoint within the printable output color gamut;

finding a boundary of the output color gamut from the first output variable;

secondly non-linearly compressing the remaining number of independent variables lying in a region near the boundary of the output color gamut to the remaining output variables for the output datapoint; and outputting the output datapoint from the color gamut compression circuit.

12. A method according to claim 11, further comprising the step of:

operating a tri-linear interpolation circuit receiving the output datapoint as an address and providing color values as an output.

13. A method according to claim 11, wherein the step of non-linearly compressing a first of the number of independent variables comprises the steps of:

performing minimal compression of the first variable when it lies in the interior of the output color gamut; and performing a greater compression of the first variable when it lies outside of the output color gamut.

14. A method according to claim 13, wherein the input color space is an L* a* b* space and said first of the number of variables is the L* space.

15. A method according to claim 14, wherein the step of secondly non-linearly compressing comprises the steps of:

testing the a* and b* spaces to determine a quadrant in which the second non-linear compression occurs;

calculating a hue angle from the a* and b* space variables for the particular L* space;

performing the second non-linear compression for the remaining number of independent variables from a hue table corresponding to the calculated hue angle and determined quadrant.

16. A method according to claim 11, wherein the non-linearly compressing and second non-linear compressing steps are carried out with a color gamut compression lookup table.

17. A circuit for mapping a requested datapoint in an input color space having a number of independent variables to an output datapoint within a printable output color gamut, comprising:
a color gamut compression circuit receiving the requested datapoint;
first means for non-linearly compressing a first of the number of independent variables of the requested datapoint to a first output variable for the output datapoint within the printable output color gamut;
means for finding a boundary of the output color gamut from the first output variable;
second means for non-linearly compressing the remaining number of independent variables lying in a region near the boundary of the output color gamut to the remaining output variables for the output datapoint; and
means for outputting the output datapoint from the color gamut compression circuit.

18. A circuit according to claim 17, further comprising:
a tri-linear interpolation circuit for receiving the output datapoint as an address and providing color values as an output.

19. A combination scanner and printer system, comprising:
an input circuit for correcting color interpretation errors found in color separation signals produced with a scanner sensor, the input circuit including:
a matrix transformation circuit receiving the color separation signals from the scanner sensor, the matrix circuit transforming the color separation signals into near-uniform color space values in accordance with predetermined error measurements of the scanner sensor;
a tri-linear lookup table coupled to the matrix transformation circuit storing a number of datapoints associated with a true color space, the lookup table being addressed by the near-uniform color space values from the matrix circuit to output a set of datapoints in the true color space nearest to the near-uniform color space values;
an interpolation circuit coupled to the tri-linear lookup table receiving the output of the lookup table and receiving the near-uniform color space values;
wherein the interpolation circuit interpolates between said set of datapoints in the true color space and the near-uniform color space values to obtain true color space values for the color separation signals produced by the scanner sensor, the true color space values being available for transmission and;
an output circuit for mapping a requested datapoint in an input color space having a number of independent variables to an output datapoint within a printable output color gamut for the printer system, the output circuit including:
a color gamut compression circuit receiving the requested datapoint;
first means for non-linearly compressing a first of the number of independent variables of the requested datapoint to a first output variable for the output datapoint within the printable output color gamut;
means for finding a boundary of the output color gamut from the first output variable; second means for non-linearly compressing the remaining number of independent variables lying in a region near the boundary of the output color gamut to the remaining output variables for the output datapoint;
means for outputting the output datapoint from the color gamut compression circuit to the printer.

20. A method for correcting color interpretation errors and for transforming an input color gamut to an output color gamut in a combination scanner and printer system, the method comprising the steps of:
operating an input circuit for correcting color interpretation errors in color separation signals produced with a scanner sensor, the step of operating comprising the steps of:
transforming the color separation signals in a matrix transformation circuit into near-uniform color space values;
addressing a tri-linear lookup table with the near-uniform color space values;
obtaining a set of the nearest known datapoints stored in the lookup table for a true uniform color space corresponding to the near-uniform color space values; and
interpolating between said set of datapoints and said near uniform color space values to determine the true uniform color space values for the color separation signals produced with the scanner sensor; and
operating an output circuit for mapping a requested datapoint in an input color space having a number of independent variables to an output datapoint within a printable output color gamut, the step of operating the output circuit comprising the steps of:
inputting the requested datapoint to a color gamut compression circuit;
non-linearly compressing a first of the number of independent variables of the requested datapoint to a first output variable for the output datapoint within the printable output color gamut;
finding a boundary of the output color gamut from the first output variable;
secondly non-linearly compressing the remaining number of independent variables lying in a region near the boundary of the output color gamut to the remaining output variables for the output datapoint; and
outputting the output datapoint from the color gamut compression circuit.

21. A method according to claim 14 and including the step of storing values representing the compression curve for a plurality of different hue angles at each value of L* that links the input and output saturation C*.

22. A method according to claim 14 and including the step of storing a compression curve for each L*.

23. A method according to claim 22 and including the step of storing for each L* a series of curves for saturation compression.

24. A method according to claim 23 and including the step of using the boundary value to determine a predetermined compression curve.

* * * * *